UNITED STATES PATENT OFFICE.

ERAZM J. JERZMANOWSKI, OF NEW YORK, N. Y., ASSIGNOR TO EDWARD STERN, OF SAME PLACE.

IMPROVEMENT IN PROCESSES OF MAKING ILLUMINATING-GAS.

Specification forming part of Letters Patent No. 177,848, dated May 23, 1876; application filed April 26, 1876.

*To all whom it may concern:*

Be it known that I, ERAZM J. JERZMANOWSKI, of the city, county, and State of New York, have invented a new and useful Process of Making Illuminating-Gas, which is described in the following specification:

The object of my invention is to utilize ordinary bituminous coal, or wood, or other carbonaceous fuel, more effectually than heretofore, for the production of illuminating-gas of high light-yielding power, by, first, distilling it in close retorts mounted in benches, in the manner usual in city gas-works, to produce carbureted-hydrogen gas, purifying this gas from moisture and carbonic acid, and collecting it in a holder. Second, when the fuel is thoroughly coked or charred, and ceases to evolve any considerable volume of gas, transferring it to a water-gas generator, and preferably one that works upon the method of Tessié du Motay, as improved by Edward Stern, and by me, in which the fuel is ignited, and its combustion stimulated, by a current of hot air passed through it, until it and the interior of the generating-chamber reach an intense white heat, when the air is shut off, the chimney closed, and a current of superheated steam passed through the fuel to generate water-gas, which is then purified from moisture and carbonic acid and collected in a holder. The flow of steam is shut off as soon as the temperature of the fuel falls to a cherry-red, the chimney is reopened, and hot-air readmitted to revive the combustion preparatory to readmitting steam. The residual fuel from the retorts, being thus subjected to the chemical reactions of air and steam alternately, yields a volume of water-gas (chiefly hydrogen and carbonic oxide) greater than that of light carbureted hydrogen mixed with some heavy carbureted hydrogen afforded by the fresh fuel while under distillation in the retorts. Third, these purified gases are mixed in due proportion, generally about equal volumes, depending upon the composition of the carbureted hydrogen, and passed through a bench of highly refractory clay or other earthen retorts, preferably of not more than about thirty-two square inches of interior cross-section, arranged in pairs in the manner usual in setting ordinary fixing-retorts, and kept at about a white heat or hotter, the retorts being of small diameter, that the mixed gases may with the more certainty be brought into contact with their hot surfaces, and thereby be intensely and quickly heated to cause their transformation into heavy hydrocarbons, such as propylene, or others of high light-yielding power, to an extent sufficient to render the gas intensely luminous, care being taken that such transformation takes place in the presence of hydrogen, or of hydrogen and carbonic oxide in excess; otherwise the luminiferous compounds generated would be decomposed before leaving the retorts, and leave the resulting gas deficient in illuminating power.

I have obtained the best results with the kinds of fuel which I have used most in producing water-gas and carbureted hydrogen for making illuminating-gas, *i. e.*, cokes from various bituminous coals having variable proportions of volatile constituents, when there was present in excess, at the terminal distillation in the transforming-retorts, both hydrogen and carbonic oxide, although the latter in excess may not in all cases be essential to a satisfactory result. If the mixed gases were not purified from moisture before entering the transforming-retorts the formation of the luminous compounds would be prevented. Carbonic acid in large quantity would have a similar effect, and in smaller quantity would hinder the transforming process and render the product inferior.

As the volume of water-gas produced from fuel exceeds that of the carbureted hydrogen, the quantity of the latter is not sufficient, particularly when made from ordinary furnace-coal yielding little heavy carbureted hydrogen, to mix with the whole of the water-gas in such proportions as will give to the product as high illuminating power as is desirable.

I have, however, met this difficulty by supplementing any deficiency of carbureted hydrogen by the vapor of petroleum, or some other volatile hydro-carbon, which I mix with the water-gas, after the carbureted hydrogen is exhausted in the transforming-retorts, in such proportions as may be required to maintain the standard of illumination; but since the resulting gas from the mixtures of hydrocarbon vapor and water-gas, although equally luminous, is somewhat different in constitution from the gas which results from the mixture of the carbureted-hydrogen and water gases, it is preferable to mix the water-gas and the carbureted-hydrogen gas in proportions in which they are generated, and regularly supplement the deficiency, if any, of carbureted hydrogen by the hydrocarbon vapor introduced with the purified gases into the transforming-retorts in such quantity as may be necessary for that purpose.

The proportion of carbureted hydrogen required in admixtures with the water-gas in the transforming-retorts can only be determined by testing the luminosity of the gas by burning a jet of it as it leaves the retorts. If the light which it gives is not sufficiently intense, the proportion of carbureted hydrogen must be increased, or that of the water-gas diminished, unless the deficiency of light results from keeping the mixed gases so long in the hot retorts that all the hydrogen or both it and the carbonic oxide are combined, in which case the gas must be passed through the retorts more rapidly by either increasing the feeding-pressure or the vacuum-force of the receiving-holder, or both, as may be expedient, so as to leave in the product free hydrogen and carbonic oxide, the presence of which, but more especially that of hydrogen, in excess, is necessary to prevent the instant decomposition of the highly-luminous constituents under such intense heat.

An excess of light or of smoking would be cured by diminishing the carbureted hydrogen, or increasing the water-gas. In case the vapor of hydrocarbon is used in admixture either with the two gases or with the water-gas alone, its proportion must be increased or diminished as the intensity of the light is deficient or in excess, unless the defect arises from keeping the admixture too long in contact with the hot retorts, in which case the remedy is to hasten its passage through them.

The hydrocarbon may be introduced as a liquid through a pipe provided with a valve, to regulate the flow into a tray placed within the end of the transforming-retort at which the gases enter, so that it will instantly vaporize and mingle with the gases, and with them traverse the retorts.

The interior of the transforming-retorts may have portions of its surface inclined for the purpose of deflecting the current of gases and vapor from side to side as it flows along, to render the admixture and heating of the gases and vapor more uniform, and thereby facilitate their transformation into permanent gas of high illuminating power.

If the transforming-retorts should be short, it might be necessary for the gases to traverse three or more of them in succession, and in that case they should be arranged in the benches in triplets, or such other number as may be adopted for a set. If made very long, or with thin sides, a single retort may be sufficient to effect the transformation, and in that case any convenient number could be arranged in a bench to receive the purified gases at one end, and at the other discharge them, duly transformed and fixed, into a common pipe, for conveyance to the holder. In case such long retort should be used, a furnace would probably be necessary under each end to maintain the elevated temperature required throughout its whole length.

The mixed gases may be heated on their way to the retorts by passing them through iron pipes heated by the waste heat of the bench, but the transforming-retorts cannot be made of iron, because the presence of that metal, highly heated, would cause the luminous gases to be decomposed as fast as formed, if it did not prevent their formation.

I have not deemed it necessary to describe in detail the apparatus by which the first operation in the process—the distillation of the coal or wood, and the purification of the resulting gases—is performed; nor the apparatus by which the second operation—the generation of water-gas from the residual fuel of the first operation, and the purification of that gas—is performed; nor the apparatus by which the third operation is performed—the redistilling of the purified gases of the first and second operations in admixture, and, when necessary, supplemented by hydrocarbon vapor, to transform the commixture into a permanent gas, suitable for illumination; as the construction and working of suitable apparatus for these several operations would, in the light of this specification, be well understood by those who are skilled in the art of making heating and illuminating gases.

What I claim is—

1. The process of making illuminating-gas by producing and purifying water-gas; distilling and purifying carbureted-hydrogen gas; mixing the purified gases, and passing them through earthen retorts, white-hot, or thereabout; the proportions of the mixture being such that there will be an excess of hydrogen, or of hydrogen and carbonic oxide, substantially as described.

2. The process of making illuminating-gas by producing and purifying water-gas; distilling and purifying carbureted hydrogen; mixing the purified gases; supplementing any deficiency of carbureted hydrogen by the vapor of petroleum, or other heavy hydrocarbon; and passing the mixture through retorts, white-hot, or thereabout, in the presence of hydrogen, or of hydrogen and carbonic oxide, in excess, substantially as described.

3. The process of making illuminating-gas by producing water-gas, and purifying it from moisture; mixing the purified gas with the vapor of a hydrocarbon; and passing the mixture through a retort at a white-heat, or thereabout; the proportion of vapor, and the time of contact of it and the gas with the hot retort, being such as to leave an excess of hydrogen, or of hydrogen and carbonic oxide, in the product, substantially as described.

ERAZM J. JERZMANOWSKI.

Witnesses:
   E. STERN,
   P. H. WATSON.